(12) United States Patent
Roberts et al.

(10) Patent No.: US 7,014,174 B2
(45) Date of Patent: Mar. 21, 2006

(54) EVAPORATIVE COOLING SYSTEM

(75) Inventors: David C. Roberts, Scottsdale, AZ (US); Luis Jorge Novelo Martin, Monterrey N. L. (MX); Juan Antonio Casas, Monterrey N. L . (MX); Garry R. Channell, Phoenix, AZ (US)

(73) Assignee: AdobeAir, Phoenix, AZ (US)

( * ) Notice: Subject to any disclaimer, the term of this patent is extended or adjusted under 35 U.S.C. 154(b) by 0 days.

(21) Appl. No.: 10/611,839

(22) Filed: Jul. 1, 2003

(65) Prior Publication Data
US 2005/0001334 A1 Jan. 6, 2005

(51) Int. Cl.
*B01F 3/04* (2006.01)

(52) U.S. Cl. .................. 261/29; 261/106; 261/107; 261/DIG. 43

(58) Field of Classification Search ........ 261/DIG. 43, 261/DIG. 3, 102–107, 28, 29
See application file for complete search history.

(56) References Cited

U.S. PATENT DOCUMENTS

| | | | | | |
|---|---|---|---|---|---|
| 4,301,094 | A | * | 11/1981 | Baus | 261/29 |
| 4,395,448 | A | * | 7/1983 | Lefevre et al. | 428/99 |
| 4,419,300 | A | * | 12/1983 | VanNess et al. | 261/106 |
| 4,428,890 | A | * | 1/1984 | Harrell | 261/29 |
| 4,459,735 | A | | 7/1984 | Sawdon | |
| 4,476,066 | A | * | 10/1984 | Gollub | 261/29 |
| 4,687,604 | A | * | 8/1987 | Goettl | 261/29 |
| 4,757,609 | A | | 7/1988 | Sawdon | |
| 4,760,634 | A | | 8/1988 | Rapp | |
| 5,031,442 | A | | 7/1991 | Kynl | |
| 5,191,767 | A | * | 3/1993 | Kane et al. | 607/728 |
| 5,236,625 | A | * | 8/1993 | Bardo et al. | 261/24 |
| 5,267,383 | A | | 12/1993 | Sawdon | |
| 5,607,011 | A | * | 3/1997 | Abdelmalek | 165/104.14 |
| 5,697,227 | A | * | 12/1997 | Bruce et al. | 62/285 |
| 5,857,350 | A | * | 1/1999 | Johnson et al. | 62/314 |
| 6,515,251 | B1 | | 2/2003 | Wind | |
| 6,544,628 | B1 | * | 4/2003 | Aull et al. | 428/179 |
| 2002/0166334 | A1 | * | 11/2002 | Houk et al. | 62/291 |

FOREIGN PATENT DOCUMENTS

EP  0 215 449 B1  3/1987

OTHER PUBLICATIONS

MasterCool II, Installation Use and Care Parts Replacement (7 pgs.).
MasterCool II, "The Most Efficient Evaporative Cooler You Can Buy," AbobeAir, Inc., 500 S. 15th St., Phoenix, AZ 85034, L900790A Mar. 1995 (2 pgs.).

(Continued)

*Primary Examiner*—Scott Bushey
(74) *Attorney, Agent, or Firm*—Foley & Lardner LLP

(57) ABSTRACT

An evaporative cooling system is disclosed. The system includes a housing including a metal base sheet and a metal side wall and having at least one opening fitted with an evaporative medium pad and an exhaust vent. A pump is configured to disperse water over the evaporative medium pad. A pan is configured to receive the water. The pump is configured to cooperate with the pan to recirculate the water. An exhaust fan is configured to draw air into the housing through the evaporative medium pad and out the exhaust vent. The metal side wall of the housing is at least partially pressed into the metal base sheet of the housing to form a joint having a corrosion resistant coating.

5 Claims, 6 Drawing Sheets

OTHER PUBLICATIONS

MasterCool II, Replacement Parts List, Models MC43/44B, HC43/44A, MC63/64B, MC63/64C, HC63/64A, HC63/64B (1 pg.).

MasterCool II Evaporative Cooler 10-Year Limited Warranty, L414302A, Jan. 1996 (1 pg.).

AdobeAir Owner's Guide Commercial/Industrial Evaporative Cooler, Use and Care Manual, AdobeAir, Inc., 500 S. 15St., Phoenix, AZ85034, L402207A, Dec. 1999 (12 pgs.).

AdobeAir, "What Is Evaporative Cooling," bearing a designation of "Apr. 22, 2003," AdobeAir (4 pgs.).

* cited by examiner

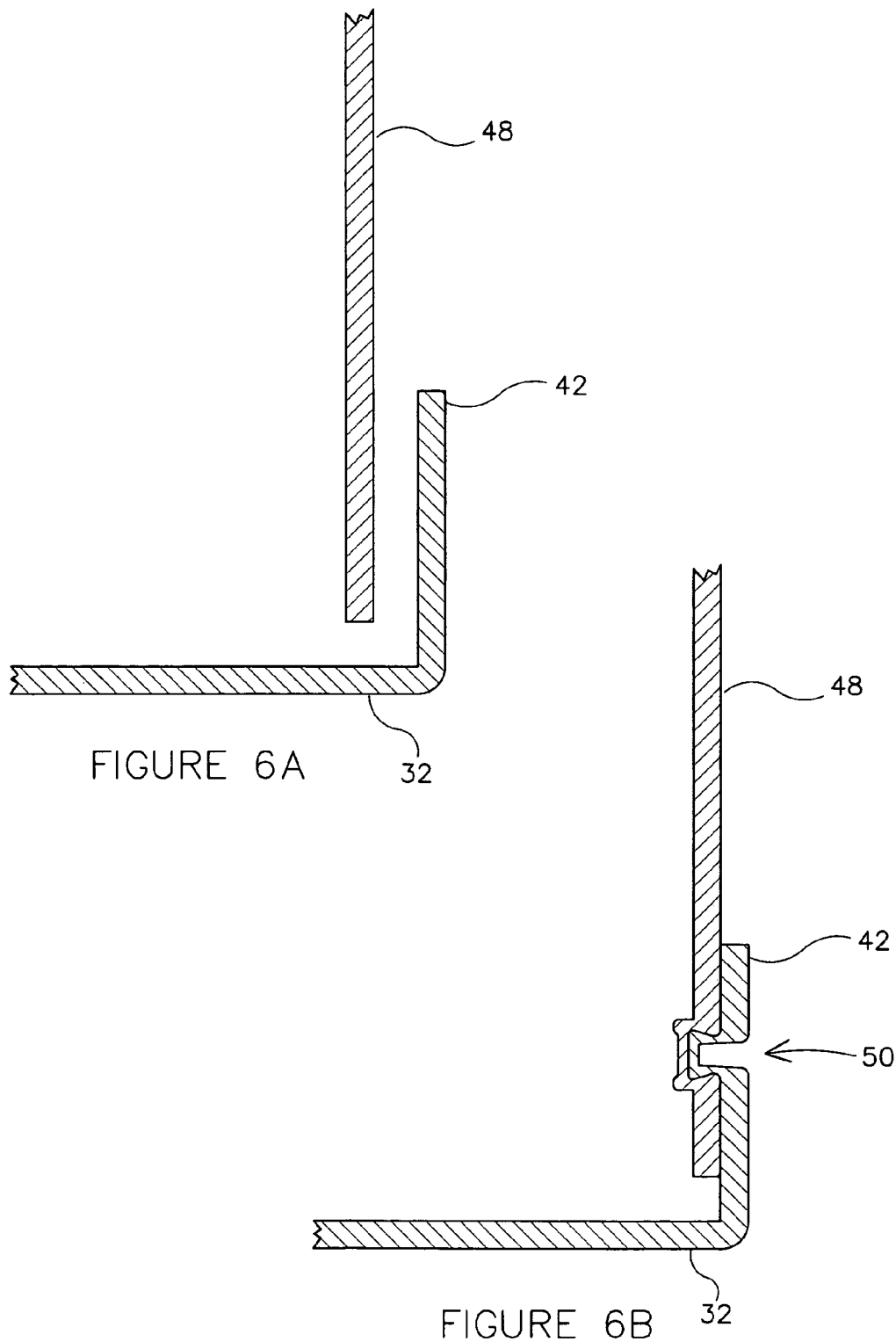

EVAPORATIVE COOLING SYSTEM

FIELD

The present invention relates generally to the field of heat exchange systems and more particularly to evaporative cooling systems.

BACKGROUND OF THE INVENTION

It is generally known to provide an evaporative cooler. Such known evaporative coolers are typically adapted for locations where the air is hot and the humidity is low. Such known evaporative coolers operate on the principle of heat absorption by moisture evaporation. Such known evaporative coolers typically draw exterior air into pads soaked with water, where the air is cooled by evaporation and then circulated. The housings of such known evaporative coolers are typically assembled by spot welding galvanized sheets of metal and then powder painting the resulting assembly or by bolting painted sheets of metal together. However, such known evaporative coolers may undergo corrosion from the water over time, especially at the unpainted surfaces of the welded joints of the housing or at the surfaces where the sheets are bolted together. Further, bolting can damage the sheets and provides a non-permanent fastener which may be loosened.

It is also generally known to provide the joining of material using "TOX" systems and methods commercially available from TOX PRESSOTECHNIK GmbH & Co. KG of Weingarten, Germany. According to such known TOX systems and methods, a punch presses the materials to be joined into a cavity. As the force continues to increase, the punch side material is forced to spread outward within the die side material resulting in a joint without burrs or sharp edges on which corrosion could form. However, such known TOX systems and methods are typically used in the automotive industry (e.g. sunroofs, engine bonnets, etc.) and are not known to be used with the housing of an evaporative cooler.

It is also generally known to provide the joining of material using the "TOG-L-LOC" sheet metal joining system commercially available from BTM Corporation of Marysville, Michigan. According to such known TOG-L-LOC sheet metal joining system, a joint is produced in a single stroke by punch and die tooling fitted to a conventional press. Such known TOG-L-LOC sheet metal joining systems offer numerous advantages: no rivets or fasteners, no secondary operations, reduced and simplified maintenance, no transformers or cooling lines, no heat buildup, joining of dissimilar metals and coated metals, leak proof joints, high repeatability, non-destructive checking, long tool life, etc. However, such known TOG-L-LOC sheet metal joining systems are not known to be used with the housing of an evaporative cooler.

It would be desirable to provide a heat exchange system such as an evaporative cooler having a housing that is assembled using a clinching technique. It would further be desirable to provide an evaporative cooler that does not require invasive fasteners or welding equipment to assemble. It would also be desirable to provide an evaporative cooler having pre-painted metal parts. It would further be desirable to provide an evaporative cooler that can be shipped as an unassembled kit of parts. It would still further be desirable to a heat exchange system having one or more of these or other advantageous features.

SUMMARY OF THE INVENTION

The present invention relates to an evaporative cooling system. The system comprises a housing comprising a metal base sheet and a metal side wall and having at least one opening fitted with an evaporative medium pad and an exhaust vent. The system also comprises a pump configured to disperse water over the evaporative medium pad. The system also comprises a pan configured to receive the water. The pump is configured to cooperate with the pan to recirculate the water. The system also comprises an exhaust fan configured to draw air into the housing through the evaporative medium pad and out the exhaust vent. The metal side wall of the housing is at least partially clinched, without fasteners to the metal base sheet of the housing to form a joint having a corrosion resistant coating.

The present invention also relates to a kit for assembling an evaporative cooling system. The kit comprises a housing comprising a base sheet and a side wall. The kit also comprises an evaporative medium pad configured to couple to the housing. The kit also comprises an exhaust vent configured to couple to the housing. The kit also comprises a pump configured to disperse water over the evaporative medium pad. The kit also comprises a pan configured to receive the water. The kit also comprises an exhaust fan configured to draw air into the housing through the evaporative medium pad and out the exhaust vent. Substantially all surfaces of the side wall and the base sheet of the housing have a corrosion resistant coating.

The present invention also relates to a method of making an evaporative cooler having a housing comprising a base sheet and a side sheet. The method comprises bending an edge of the base sheet to form a base flange. The method also comprises applying a corrosion resistant coating to the base sheet and the side sheet. The method also comprises clinching a portion of the side sheet and a portion of the base flange thereby forming a joint comprising the side sheet at least partially pressed into the base flange.

The term "crimp" as used in this disclosure is intended to have its commonly understood or general meaning (e.g. press or pinch into small regular folds or ridges).

The term "clinch" as used in this disclosure is intended to have its commonly understood or general meaning (e.g. to hold firmly, to hold fast by grasping or embracing tightly, to bend or turn over the point of so that it will hold fast).

The term "coating" as used in this disclosure is intended to be a broad term and not a term of limitation. The term "coating" as used in this disclosure may include, without limitation any decorative or functional surface treatment, paint, liquid dispersion, finish, surface finish, varnish, pigment, colorant, powder coating, other coating, etc.

BRIEF DESCRIPTION OF THE DRAWINGS

FIG. 6A is an exploded fragmentary sectional view of a case for the heat exchange system of FIG. 1 in a pre-assembled condition according to an exemplary embodiment.

FIG. 6B is a fragmentary sectional view of the case of FIG. 6A in an assembled condition according to an exemplary embodiment.

DETAILED DESCRIPTION OF THE PREFERRED EMBODIMENTS

Figure 1:
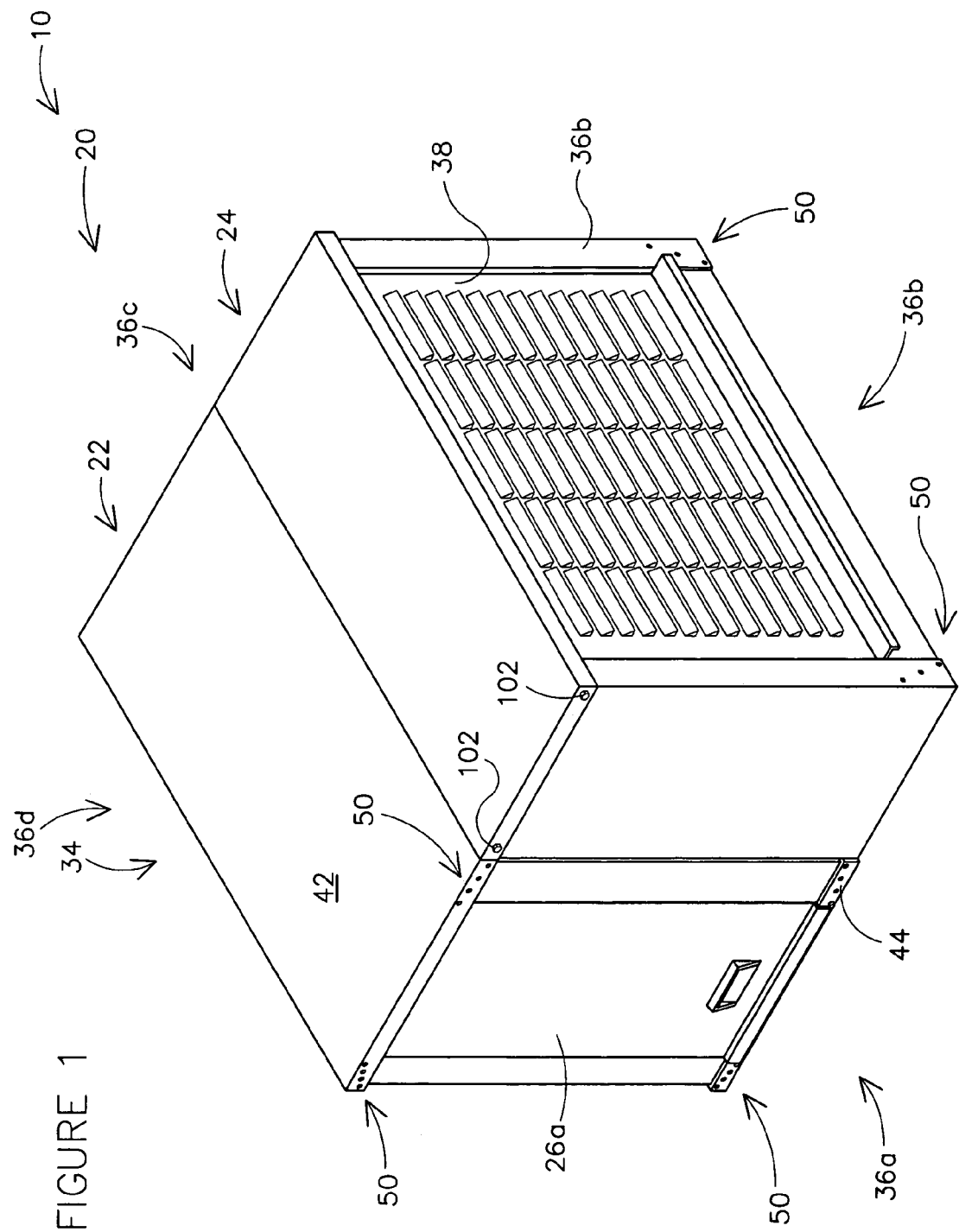
FIG. 1 is a front perspective view of a heat exchange system according to a preferred embodiment.
Figure 2:
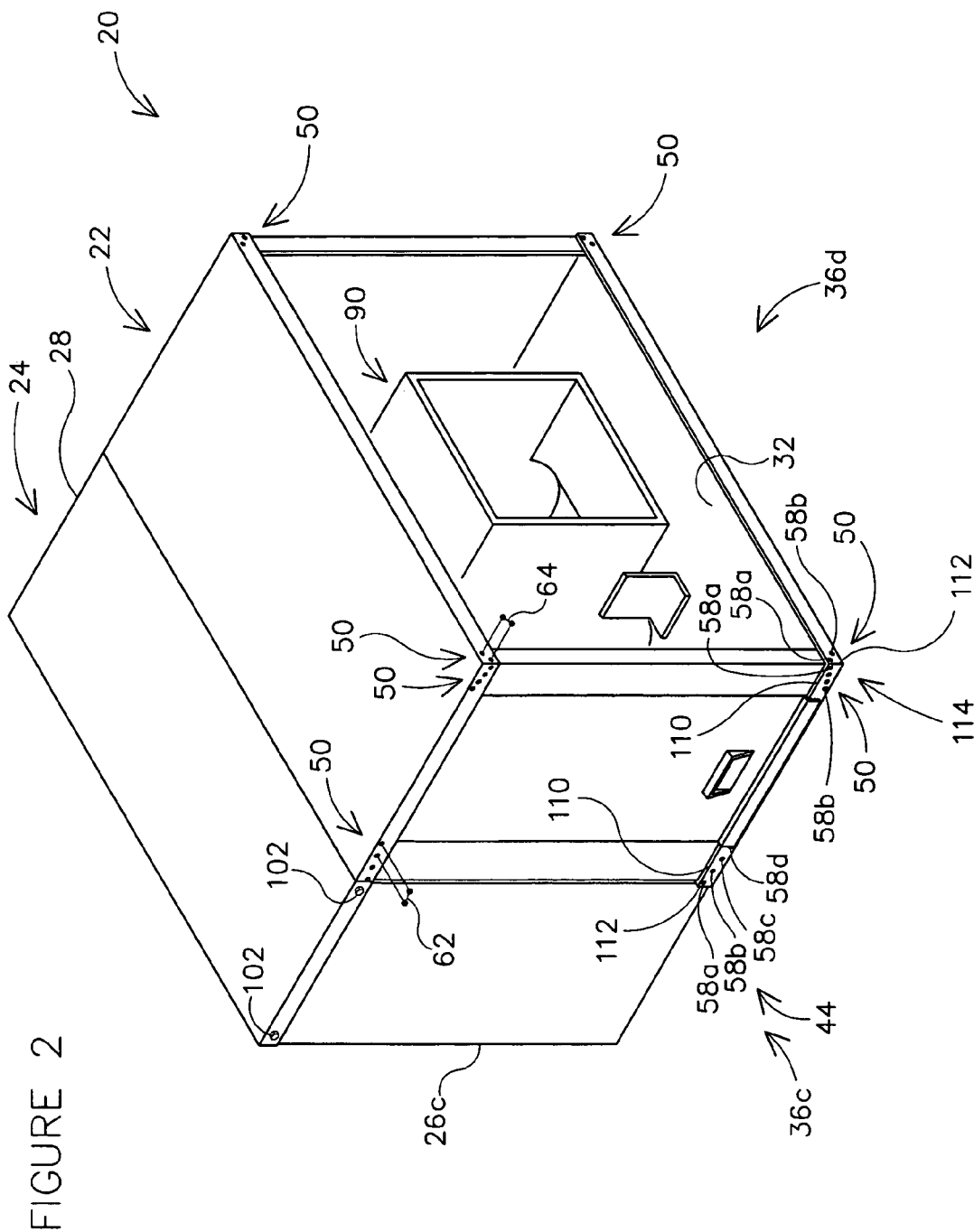
FIG. 2 is a rear perspective view of the heat exchange system of FIG. 1.
Figure 5:
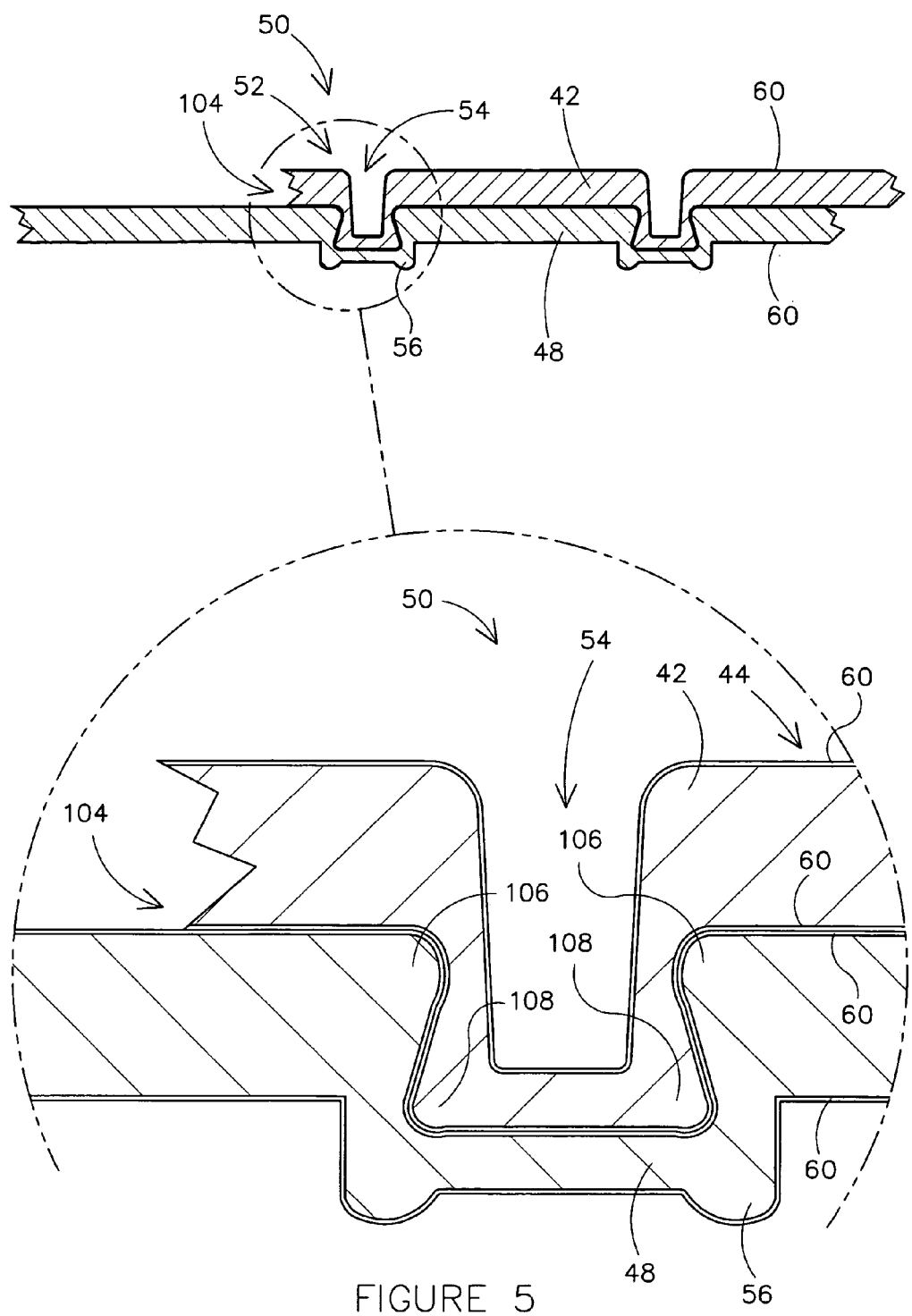
FIG. 5 is a fragmentary sectional view of the heat exchange system of FIG. 1 according to a preferred embodiment.

A heat exchange system or heat exchanger is shown as an evaporative cooler 10 in FIGS. 1 and 2 according to a preferred embodiment. Evaporative cooler 10 includes a casing or housing 20 encapsulating a cooling system 70 (see FIG. 3). The walls of housing 20 are connected by a crimped or clinched joint 50. The uniformity of the surface of a corrosion resistant coating 60 provided over the walls of housing 20 is not broken or damaged by the clinching of joint 50 according to a preferred embodiment as shown in FIG. 5.

According to a preferred embodiment, the housing may be shipped as an unassembled or partially assembled, relatively compact kit of parts or pieces, including the relatively flat cover, base and side walls of the housing. Substantially all surfaces of the housing are coated with the corrosion resistant coating prior to assembly of the housing according to a preferred embodiment. The joints may be formed on-site (e.g. by clinching) upon receipt of the kit without screwing or riveting the parts together with an invasive fastener or weld (which can lead to corrosion). Thus, the assembly of the kit can be done in any location with simple equipment.

Figure 3:
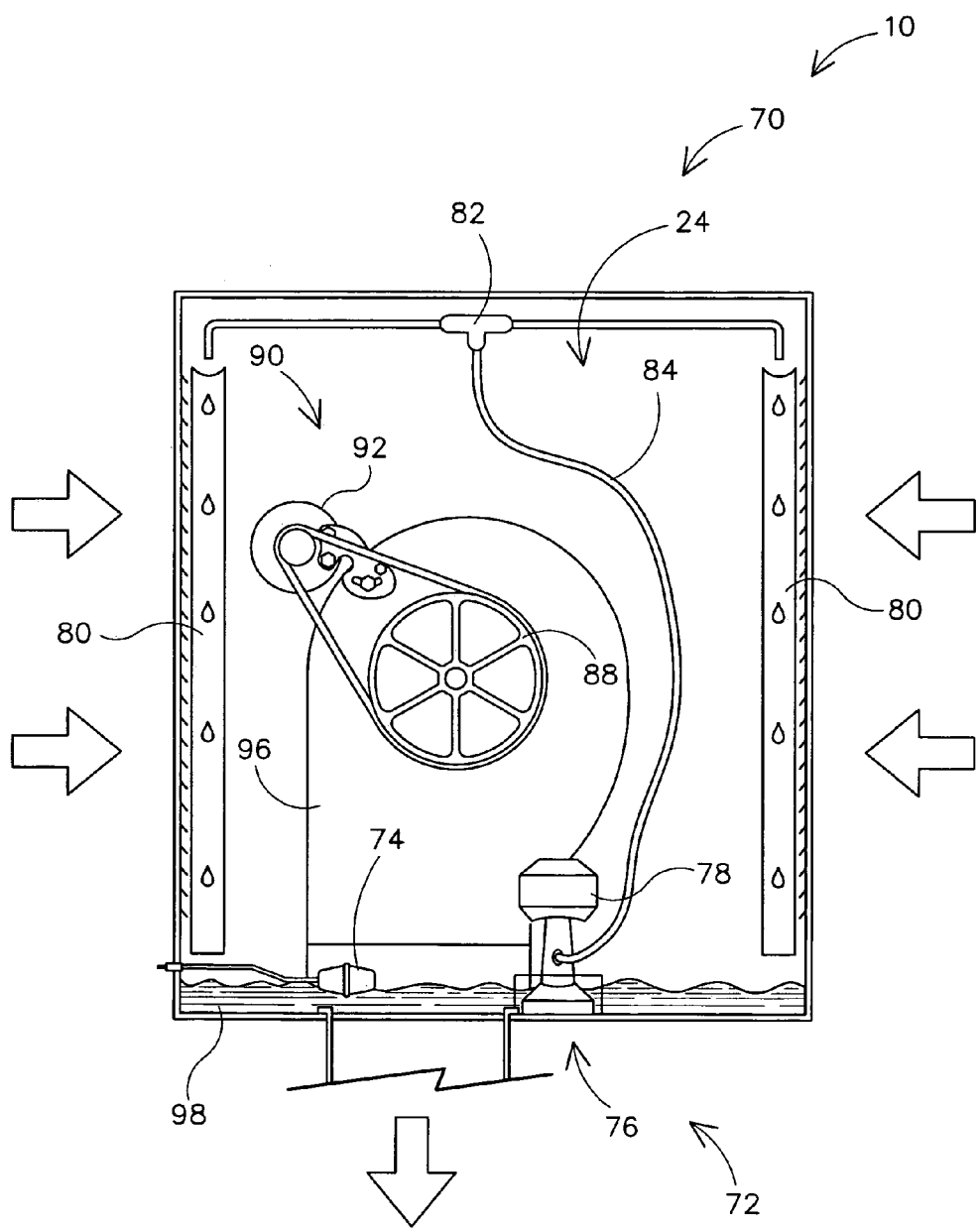
FIG. 3 is a sectional view of the heat exchange system of FIG. 1 according to an alternative embodiment.

Referring to FIG. 3, evaporative cooler 10 is shown according to an alternative embodiment. A water distribution network 82 in housing 20 disperses water over two evaporative media pads 80 supported by a tray 94 in housing 20 (see FIG. 4). An air intake or louver vent 38 draws exterior air through and/or across pad 80 (soaked with water) (see FIG. 3). The temperature of the exterior air is reduced or cooled due to evaporation of the water.

Referring further to FIG. 3, the cooled air is drawn out of housing 20 by an exhaust system 90. Exhaust system 90 includes a motor 92 connected to a pulley 88 of a blower 96 for venting the cooled air to a desired location such as a work or residential space. Housing 20 includes a dry chamber 22 and a wet chamber 24 (see FIG. 1). Dry chamber 22 is intended to be substantially free of water. Dry chamber 22 provides an area intended for blowing the cooled air to the desired location with exhaust system 90. Wet chamber 24 is intended as an area for supporting evaporative media pad 80 and an area for the evaporation of water from pad 80.

Wet chamber 24 may include a water recirculation system 72 for recycling non-evaporated water from a pan 98 back to evaporative media pad 80 as shown in FIG. 3 according to an alternative embodiment. Recirculation system 72 includes a sensor (shown as a float 74) for providing a signal representative of the volume of water in a pan 98. Recirculation system 72 also includes a pump assembly 76 having a water pump 78 connected to water distribution network 82 by a hose 84. Water distribution network 82 provides for the dispersion of the recycled (as well as "original" or source water) over evaporative media pad 80.

Figure 4:
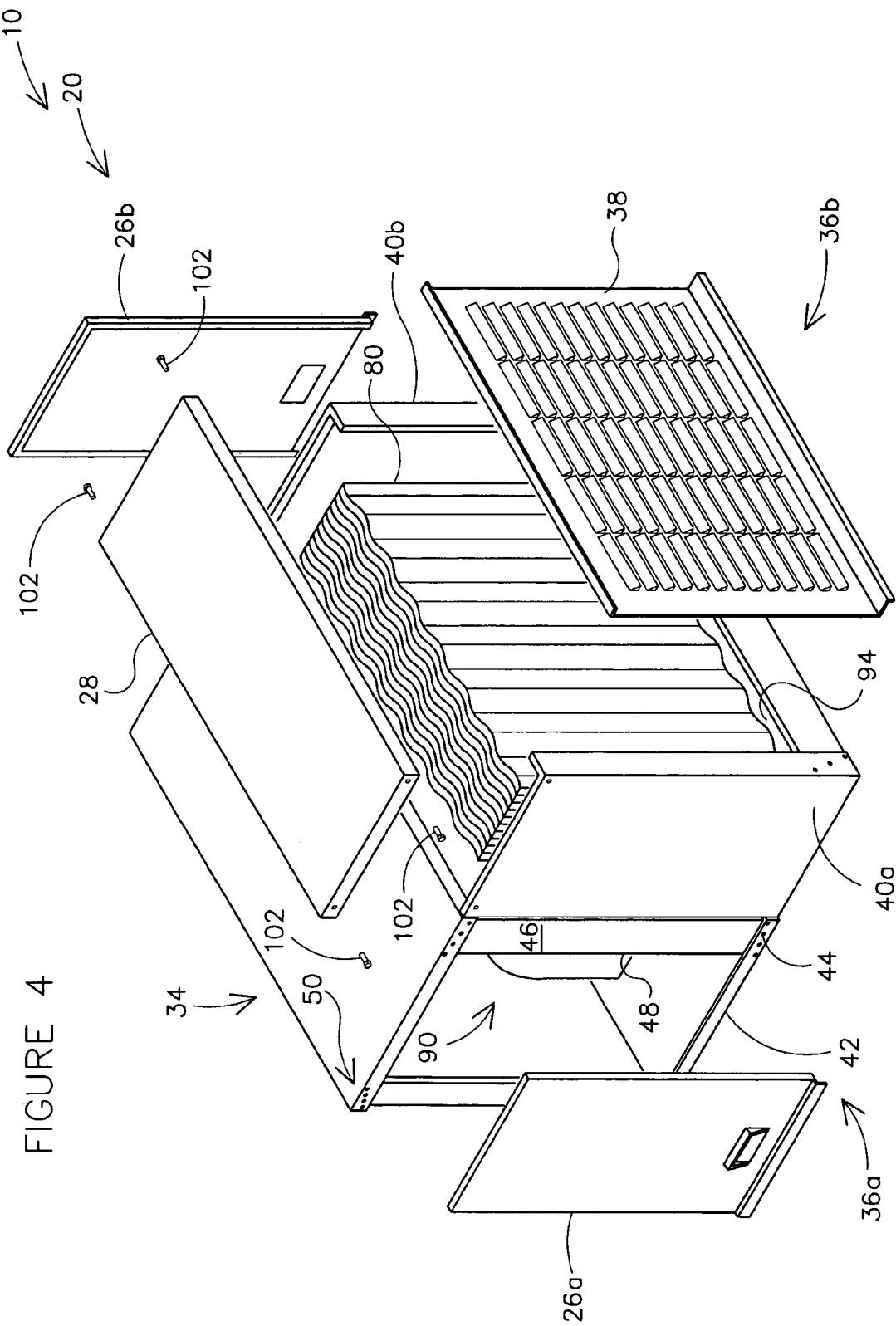
FIG. 4 is an exploded perspective view of the heat exchange system of FIG. 1 according to an exemplary embodiment.

Referring to FIGS. 1, 2 and 4, housing 20 of evaporative cooler 10 comprises four side walls 36a, 36b, 36c and 36d each connected to a base 32 and a cover 34. Cover 34 includes a removable panel 28 connected by a removable invasive fastener (shown as a bolt 102) to a panel 40a of side wall 36a and a panel 40c of side wall 36c for providing access to wet chamber 24. Side wall 36a includes a removable panel 26a and panel 26c attached (e.g. by friction fit along an edge or vertically upright base flange 42) to base 32 and cover 34 for providing access to dry chamber 22. Vent 38 of side wall 36b provides for the intake of outside or exterior air into housing 20. The side walls, base and cover are each a sheet of metal material such as galvanized steel according to a preferred embodiment.

Referring to FIGS. 2 and 4, joint 50 is shown connecting an exterior surface 44 of flange 42 and an interior surface 46 of a vertical post or frame 48 of side wall 36a. Joint 50 is formed by "punch" pressing (e.g. with a punch and die) flange frame 48, thereby forming a ridge or fold 52 (see FIG. 5). Fold 52 includes a recess 54 outlined by a protrusion 56. Referring to FIG. 5, a portion 106 of frame 48 overlies a portion 108 of flange 42 on both sides of joint 50 and forms the mechanical interlock. In one embodiment, the joint is circular.

Referring to FIG. 6A, base 32 and frame 48 are shown prior to assembly of housing 20 according to an exemplary embodiment. Base 32 includes flange 42 as shown in FIG. 6A formed by bending a flat piece of sheet metal. To fasten flange 42 to frame 48 during assembly of housing 20, flange 42 is positioned to engage frame 48. Joint 50 is then formed by clinching (e.g. pressing or folding and mechanically interlocking) flange 42 and frame 48 as shown in FIG. 6B.

According to a particularly preferred embodiment, joint 50 comprises areas of clinching (shown as clinch 58a, clinch 58b, clinch 58c and clinch 58d in FIG. 2) to securely fasten the side walls to the cover and the base of housing 20. The areas of clinching are arranged diagonally according to a particularly preferred embodiment as shown in FIG. 2. The center of each of the clinched areas is separated by a horizontal distance 62 and a vertical distance 64 as shown in FIG. 2.

As illustrated in FIG. 2, clinch 58a is closest to an upper edge 110 and a side edge 112 of flange 42. Clinches 58b, 58c and 58d are progressively further from upper edge 110 and side edge 112, respectively. The locations of the areas of clinching aids to secure the free corner of flange 42. According to a particularly preferred embodiment as shown in FIG. 2, the first area of clinching (e.g. clinch 58d) is closer to the peripheral edge of housing 20 (e.g. the fold line of flange 42 opposite upper edge 110) than the second, diagonally offset area of clinching (e.g. clinch 58a) closest to side edge 112 of housing 20.

According to a particularly preferred embodiment as shown in FIG. 2, clinch 58a of side wall 36c and clinch 58a of side wall 36d (opposite each other at a corner 114) are closer together than clinch 58b of side wall 36c and clinch 58b of side wall 36d (opposite each other at corner 114). According to a particularly preferred embodiment as shown in FIG. 2, clinch 58a of side wall 36c and clinch 58a of side wall 36d (opposite each other at corner 114) are closer to upper edge 110 and side edge 112 than are clinch 58b of side wall 36c and clinch 58b of side wall 36d (opposite each other at corner 114). According to an alternative embodiment, the base flanges of the corner may be welded to the side walls. According to another alternative embodiment, the base flanges of the corner may be welded to each other. According to another alternative embodiment, the areas of clinching may be arranged in any pattern (e.g. increasing diagonal, decreasing diagonal, vertical, horizontal, staggered, etc.).

According to a particularly preferred embodiment, the horizontal distance between the areas of clinching is about 0.75 inches to about 1.4 inches, and the vertical distance between the areas of clinching is about 0.13 inches to about 0.4 inches. According to a particularly preferred embodiment, at least one of the areas of clinching is offset from the peripheral edge of the housing by about 0.4 inches, and the areas of clinching are each offset from the peripheral edge of the housing by at least about 0.4 inches.

According to one embodiment, the joint is formed by the TOX method, which is described in European Patent No. 0 215 449 entitled "Method And Device For Joining Thin Plates" issued to Eugen Rapp on May 22, 1991, which is hereby incorporated by reference. According to another embodiment, the joint is formed by the TOG-L-LOC sheet metal joining system which is described in the following U.S. Patents: U.S. Pat. No. 5,267,383 titled "Apparatus for Joining Sheet Material" issued to Edwin G. Sawdon on Dec. 7, 1993; U.S. Pat. No. 5,031,442 titled "Punch Anvils for Sheet Fastening Systems" issued to Miroslav Kynl on Jul. 16, 1991; U.S. Pat. No. 4,757,609 titled "Apparatus for Joining Sheet Material" issued to Edwin G. Sawdon on Jul. 19, 1988; and U.S. Pat. No. 4,459,735 titled "Joining Sheet Metal" issued to Edwin G. Sawdon on Jul. 17, 1984, each of which are hereby incorporated by reference.

Referring to FIG. 5, coating 60 is shown covering exterior surface 44 of flange 42 and interior surface 46 of frame 48. Coating 60 is also shown in FIG. 5 covering the entire interface 104 between exterior surface 44 and interior surface 46. According to a preferred embodiment, the base, cover and side wall are covered with a corrosion resistant coating before they are connected to form the joint.

According to a preferred embodiment, the coating is a polyester-epoxy, powder coated, multi-layer, bonded treatment. The coating is first applied to heavy gauge, cold-rolled steel and the coating is then built layer by layer according to a preferred embodiment. The coating is intended to provide protection from weathering and corrosion according to any preferred or alternative embodiment. The coating may be a decorative appliance-type surface finish according to an alternative embodiment.

Conventional welding of multi-layer coated steel removes all of the protective layers except for the steel. Even if the multi-layer coated steel is painted after welding, the only protective layer in the region of the weld is the paint. The clinch system described herein allows for all of the protective layers to remain intact. As a result, the joined pieces of steel are less likely to rust or be corroded by the chemicals and minerals in the water circulated within the evaporative cooler.

The heat exchange system may be placed outdoors as well as indoors according to any preferred or alternative embodiment. The heat exchange system is intended to be placed where there is an abundance of fresh air, and may be positioned adjacent to an open window or external door with additional openings on the opposite side of the room for relief air according to alternative embodiments. In this way, the heat exchange system may draw fresh air from the outside and be drawn through the pad, cooled, filtered and circulated through the room while the hot, stale air is forced out through the openings on the other side of the room.

The heat exchange system may be used in a variety of environments, including at least: industrial and commercial settings (e.g. industrial plants, factories, assembly lines, warehouses, commercial kitchens, laundries, dry cleaners, greenhouses, confinement farming (such as poultry ranches, hog, dairy, etc.), retail outlets, garden centers, auto shops, hotels/resorts, etc.); residential settings (e.g. workshops, garages, kennels, horse stables, patios, barns, exercise areas, etc.), outdoor settings (e.g. loading docks, construction sites, athletic events, tented parties, sporting events, pools and patios, outdoor retail etc.), etc.

It is important to note that the construction and arrangement of the elements of the heat exchange system as shown in the preferred and other exemplary embodiments is illustrative only. Although only a few embodiments of the present invention have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in the claims. For example, the elements of the housing may be painted before bending according to an alternative embodiment. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present invention as expressed in the appended claims.

What is claimed is:

1. An evaporative cooling system comprising:
a housing comprising a metal base sheet and a metal side wall and having at least one opening fitted with an evaporative medium pad and an exhaust vent;
a pump configured to disperse water across the evaporative medium pad;
a pan configured to receive the water, wherein the pump is configured to cooperate with the pan to recirculate the water;
an exhaust fan configured to draw air into the housing through the evaporative medium pad and out the exhaust vent;
wherein the metal side wall of the housing is at least partially clinched, without fasteners, to the base sheet of the housing to form a joint having a corrosion resistant coating.

2. The evaporative cooling system of claim 1 wherein the side wall is at least partially pressed into the base sheet.

3. The evaporative cooling system of claim 1 wherein the side wall is at least partially folded into the base sheet.

4. The evaporative cooling system of claim 3 wherein the corrosion resistant coating comprises a multi-layer coating.

5. The evaporative cooling system of claim 4 wherein the corrosion resistant coating comprises a powder coated finish.

* * * * *